United States Patent
Tadano

(10) Patent No.: US 10,180,882 B2
(45) Date of Patent: Jan. 15, 2019

(54) INFORMATION-PROCESSING DEVICE, PROCESSING METHOD, AND RECORDING MEDIUM IN WHICH PROGRAM IS RECORDED

(71) Applicant: NEC Corporation, Minato-ku, Tokyo (JP)

(72) Inventor: Kumiko Tadano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 15/301,753

(22) PCT Filed: May 11, 2015

(86) PCT No.: PCT/JP2015/002374
§ 371 (c)(1),
(2) Date: Oct. 4, 2016

(87) PCT Pub. No.: WO2015/174068
PCT Pub. Date: Nov. 19, 2015

(65) Prior Publication Data
US 2017/0060693 A1    Mar. 2, 2017

(30) Foreign Application Priority Data

May 16, 2014   (JP) ................................. 2014-102278

(51) Int. Cl.
*G06F 11/00*    (2006.01)
*G06F 11/14*    (2006.01)
(Continued)

(52) U.S. Cl.
CPC .......... *G06F 11/1438* (2013.01); *G06F 9/445* (2013.01); *G06F 9/44589* (2013.01); *G06F 11/30* (2013.01); *G06F 2201/805* (2013.01)

(58) Field of Classification Search
CPC ............................ G06F 11/1438; G06F 11/30
See application file for complete search history.

(56) References Cited

U.S. PATENT DOCUMENTS

2015/0149584 A1* 5/2015 Yochai .............. G06F 17/30067
709/217

FOREIGN PATENT DOCUMENTS

JP    H06-139110 A    5/1994
JP    2008-210148 A    9/2008
(Continued)

OTHER PUBLICATIONS

International Search Report for PCT Application No. PCT/JP2015/002374 dated Aug. 11, 2015.
(Continued)

*Primary Examiner* — Bryce P Bonzo
*Assistant Examiner* — Katherine Lin

(57) ABSTRACT

An acquisition unit that acquires, based on a combination of failures in components of an information system, a correction subprocedure for identifying a cause of failure and correcting trouble and a reconstruction subprocedure for reconstructing the component; a generator that generates at least one candidate for a service restart procedure of the information system by connecting the correction and the reconstruction subprocedures based on a dependency relationship between the acquired correction and reconstruction subprocedures; an estimator that estimates required time of at least one candidate for the service restart procedure; and a selector that identifies the service restart procedure, of which required time satisfies desired restoration time from among the candidates for the service restart procedure and selects, from among the identified candidates for the service restart procedure that has the risk of exceeding the desired restoration time, the service restart procedure based on a high/low degree of the risk.

10 Claims, 12 Drawing Sheets

(51) Int. Cl.
 *G06F 9/445* (2018.01)
 *G06F 11/30* (2006.01)

(56) References Cited

FOREIGN PATENT DOCUMENTS

| | | |
|---|---|---|
| JP | 2011-076161 A | 4/2011 |
| JP | 2011-145848 A | 7/2011 |
| JP | 2011-159218 A | 8/2011 |
| WO | 2009/116172 A1 | 9/2009 |
| WO | 2014/061199 A1 | 4/2014 |

OTHER PUBLICATIONS

English translation of Written opinion for PCT Application No. PCT/JP2015/002374.

\* cited by examiner

Fig. 2

| CORRECTION SUBPROCEDURE ID | TARGET COMPONENT ID | REQUIRED TIME UPON SUCCESS | SUCCESS RATE | REQUIRED TIME UPON FAILURE |
|---|---|---|---|---|
| 1 | A | 1.0 [h] | 0.99 | 4 [h] |
| 2 | B | 0.8 [h] | 0.98 | 3 [h] |
| 3 | C | 0.5 [h] | 0.95 | 3 [h] |
| 4 | D | 0.5 [h] | 0.99 | 3 [h] |
| 5 | A,B | 1.5 [h] | 0.95 | 5 [h] |
| ... | ... | | | |

Fig. 4

| RECONSTRUCTION SUBPROCEDURE ID | TARGET COMPONENT ID | REQUIRED TIME UPON SUCCESS | SUCCESS RATE | REQUIRED TIME UPON SUCCESS |
|---|---|---|---|---|
| I | A | 0.3 [h] | 99% | 0.5 [h] |
| II | B, C, D | 0.6 [h] | 95% | 1 [h] |
| III | D | 0.4 | 98% | 0.6 [h] |
| IV | B, D | 0.6 [h] | 97% | 0.8 [h] |
| ... | | | | |

Fig. 5

| NAME OF SUBPROCEDURE | ID | PREREQUISITE SUBPROCEDURE | NECESSARY CONDITION | SIMULTANEOUSLY UNEXECUTABLE SUBPROCEDURE | STATE ACHIEVED BY SUBPROCEDURE |
|---|---|---|---|---|---|
| CORRECTION SUBPROCEDURE 1 | 1 | none | none | none | none |
| CORRECTION SUBPROCEDURE 2 | 2 | 1 | none | none | none |
| CORRECTION SUBPROCEDURE 3 | 3 | none | none | 4 | Component 1 is up |
| CORRECTION SUBPROCEDURE 4 | 4 | none | none | 3 | Component 2 is up |
| CORRECTION SUBPROCEDURE 5 | 5 | none | none | none | Components 3 & 4 are up |
| CORRECTION SUBPROCEDURE 6 | 6 | 2 | none | none | none |
| CORRECTION SUBPROCEDURE 7 | 7 | none | none | none | none |
| RECONSTRUCTION SUBPROCEDURE 8 | 8 | none | Component 1 is up | none | Component 6 is up |
| RECONSTRUCTION SUBPROCEDURE 9 | 9 | none | none | none | Component 7 is up |
| RECONSTRUCTION SUBPROCEDURE 10 | 10 | none | none | 9 | Component 8 is up |
| RECONSTRUCTION SUBPROCEDURE 11 | 11 | none | none | none | Components 9 & 10 are up |

INFORMATION-PROCESSING DEVICE, PROCESSING METHOD, AND RECORDING MEDIUM IN WHICH PROGRAM IS RECORDED

This application is a National Stage Entry of PCT/JP2015/002374 filed on May 11, 2015, which claims priority from Japanese Patent Application 2014-102278 filed on May 16, 2014, the contents of all of which are incorporated herein by reference, in their entirety.

TECHNICAL FIELD

The present invention relates to an information-processing device, a processing method, and a recording medium that stores a program, which generate a procedure to restart a service of an information system where a failure occurred.

BACKGROUND ART

A large-scale disaster may possibly lead to simultaneous failures of many components in an information system. To restore the information system in such a situation, an operation procedure for changing a state where simultaneous failures of components are occurring in to a state where the service can be restarted (hereinafter, referred to as a service restart procedure) is required. It should be noted that, in the following description, a component may refer to a component group that includes a plurality of components. Further, a subprocedure may refer to a subprocedure group that includes a plurality of subprocedures.

As one of general customer requirements that are defined in relation to failure restoration of an information system, there is an index called Recovery Time Objective (RTO) that represents time required for restoration. If the information system cannot satisfy RTO, the provider of the information system may need to pay a penalty cost to the customer. Thus, a provider of the information system needs to generate a service restart procedure so as to satisfy RTO.

When a failure occurs in an information system that ensures a certain RTO based on Service Level Agreement, there are roughly the following two approaches as a method of restarting the service. The first approach is identifying the cause of each component failure and correcting a trouble spot in accordance with a predetermined procedure. However, a service may not be able to restart within allowable time by identifying and correcting the cause of a failure. This is because identification of the cause may take time in the case that the cause of a failure is complicated, or identification and correction may take long time until completion in the case that there are a large number of correction portions. As such, the second approach may reconstruct at least a portion of the components of a system may instead of identifying and correcting the cause of a failure. The second approach may restart a service faster than the first approach since it does not require identification and correction of the cause of a failure.

The service restart procedure of an information system includes at least one subprocedure for restoring the information system from an occurred component failure (for example, a system management operation through input of a variety of commands, an operation of a graphical user interface, and the like). Subprocedures are written, for each component as a restoration target, in a document or a manual. A required service restart procedure differs in accordance with a combination of failures of components, since a required subprocedure is different for each failure. It is unfeasible for a user to manually generate service restart procedures for all combinations, since the number of the combinations of simultaneous failures is vast for a large number of components. Thus, automatic generation of service restart procedures is reasonable.

In the description below, the following two kinds of subprocedures are defined as subprocedures for restoring an information system from component failures. The first is a subprocedure that identifies a cause of a failure and corrects the failure (hereinafter, referred to as a correction subprocedure). The second is a subprocedure that reconstructs a component, instead of identification of the cause and correction of the failure (hereinafter, referred to as a reconstruction subprocedure). It should be noted that reconstruction subprocedures are not always prepared for all components due to the cost for preparing the reconstruction subprocedures, the limitations of implementation on an information system, and other reasons. The reconstruction subprocedure may be automatized using an existing system configuration management tool.

A service restart procedure includes a combination of the above-described correction subprocedure and reconstruction subprocedure. There may be a plurality of candidates for a service restart procedure for a combination of simultaneous failures, since a plurality of combinations of correction subprocedures and reconstruction subprocedures can be considered for a combination of simultaneous failures. It should be noted that a service restart procedure may include only one of a correction subprocedure or a reconstruction subprocedure.

A reconstruction subprocedure may collectively reconstruct a plurality of components from an efficiency perspective. The reconstruction subprocedure includes, for example, deployment of a virtual machine, in which an application or the like that takes time for setup has been installed, and use of a package, in which a plurality of pieces of software that are often used as a set are configured to collectively and jointly operate. Since such a reconstruction subprocedure can reconstruct a plurality of components at once, required time for the service restart procedure may be largely reduced.

On the other hand, such a reconstruction subprocedure may include components that are not necessary to be reconstructed. In such a case, collective reconstruction may generate an unexpected failure of a component that was supposedly normally operating. If responding to such an unexpected failure takes time, service restart that satisfies RTO may not be performed.

Whereas, a scheduling method that takes into account of restoration time for responding to a system failure is known. PTL 1 describes a method of generating a timetable for meeting a deadline and increasing probability of restoration. Specifically, in PTL 1, a timetable for performing response procedures in the order from higher restoration rates per unit time is generated.

Further, PTL 2 describes a countermeasure selection device for efficiently selecting the optimal combination of countermeasures to make the restoration time of business operation not more than a target value.

Further, PTL 3 describes using state transition data that indicates a state transition process for each resource from the occurrence of a failure and defines a transition condition of a state transition of a dependency destination definition resource in association with the state of a dependency destination resource and calculating a state transition of each resource from the occurrence of a failure while determining if there is a state transition based on the state of the dependency destination resource for the dependency destination definition resource.

Further, PTL 4 describes improvement in unnecessary increase of maintenance parts by calculating an output obtained from a flag code and determining the state of preparing the parts indicated by the flag code.

CITATION LIST

Patent Literature

PTL 1: Japanese Laid-open Patent Publication No. 2008-210148
PTL 2: International Laid-open Patent Publication No. WO2009/116172
PTL 3: Japanese Laid-open Patent Publication No. 2011-145848
PTL 4: Japanese Laid-open Patent Publication No. Hei 06-139110

SUMMARY OF INVENTION

Technical Problem

The technique described in PTL 1 cannot avoid the risk of exceeding RTO caused by a failure that newly occurred as the result of performing a subprocedure. In addition, subprocedures may not be able to be performed in the order described in PTL 1, as, in reality, a variety of dependency relationships exist among the subprocedures for responding to component failures of an information system.

The objective of the present invention is to provide an information-processing device, a processing method, and a program which, in accordance with a combination of occurred component failures, satisfy RTO by performing a service restart procedure and reduce a risk of not satisfying RTO due to occurrence of an unexpected failure caused by performing the service restart procedure.

Solution to Problem

An information-processing device according to an exemplary embodiment of the present invention, includes:
an acquisition unit that acquires, based on a combination of failures occurred in components of an information system, a correction subprocedure for identifying a cause of the failure of the component and correcting a trouble spot, and a reconstruction subprocedure for reconstructing the component;
a generation unit that generates at least one candidate for a service restart procedure of the information system by connecting the correction subprocedure and the reconstruction subprocedure in accordance with a dependency relationship between the acquired correction subprocedure and reconstruction subprocedure;
an estimation unit that estimates required time of the at least one candidate for the service restart procedure; and
a selection unit that identifies the service restart procedure, of which required time satisfies desired restoration time from among the candidates for the service restart procedure and selects, from among the identified candidates for the service restart procedure that has the risk of exceeding the desired restoration time, the service restart procedure based on a high/low degree of the risk.

A processing method according to another exemplary embodiment of the present invention, includes:

acquiring, based on a combination of failures occurred in components of an information system, a correction subprocedure for identifying a cause of the failures of the components and correcting a trouble spot, and a reconstruction subprocedure for reconstructing the components;
generating at least one candidate for a service restart procedure of the information system by connecting the correction subprocedure and the reconstruction subprocedure in accordance with a dependency relationship between the acquired correction subprocedure and reconstruction subprocedure;
estimating required time of the at least one candidate for the service restart procedure; and
identifying the service restart procedure, of which required time satisfies desired restoration time from among the required time of the candidates for the service restart procedure and selecting, from among the identified candidates for the service restart procedure that has a risk of exceeding the desired restoration time, the service restart procedure based on a high/low degree of the risk.

A program according to still another exemplary embodiment of the present invention, causes a computer to execute:
acquiring, based on a combination of failures occurred in components of an information system, a correction subprocedure for identifying a cause of the failure of the component and correcting a trouble spot, and a reconstruction subprocedure for reconstructing the component;
generating at least one candidate for a service restart procedure of the information system by connecting the correction subprocedure and the reconstruction subprocedure in accordance with a dependency relationship between the acquired correction subprocedure and reconstruction subprocedure;
estimating required time of the at least one candidate for the service restart procedure; and
identifying the service restart procedure, of which required time satisfies desired restoration time from among the required time of the candidates for the service restart procedure, and selecting, from among the identified candidates for the service restart procedure that has a risk of exceeding the desired restoration time, the service restart procedure based on a high/low degree of the risk Advantageous Effects of Invention According to the present invention, in accordance with a combination of occurred component failures, RTO is satisfied by performing a service restart procedure and a risk of not satisfying RTO due to occurrence of an unexpected failure caused by performing the service restart procedure is reduced.

The following will describe further effects and exemplary embodiments of the present invention in detail with descriptions and drawings.

BRIEF DESCRIPTION OF DRAWINGS

FIG. 2 is an explanatory view illustrating an example of correction subprocedures that are stored in a first storage unit and components relating to the correction subprocedures according to the first exemplary embodiment;

FIG. 4 is an explanatory view illustrating an example of reconstruction subprocedures and components relating to the reconstruction subprocedures, stored in a second storage unit according to the first exemplary embodiment;

FIG. 5 is an explanatory view illustrating an example of subprocedures that are stored in a third storage unit and dependency relationships of the subprocedures according to the first exemplary embodiment;

DESCRIPTION OF EMBODIMENTS

The following will describe the exemplary embodiments of the information-processing device according to the present invention with reference to the drawings.

When simultaneous failures of components occur due to a disaster, a system operator (hereinafter, referred to as an operator) has a responsibility to restore components according to a service restart procedure. As a necessary subprocedure differs depending on a combination of components where failures occurred, the operator first identifies the components where failures occurred and, then, performs a subprocedure that is necessary for restoration of a system. The failure state of a component of the system includes a state where the component cannot be normally used, such as "a part of necessary commands cannot be performed" and "a part of data necessary for the system has been diminished," in addition to crash of the component. Depending on such a different kind of failure state, a necessary subprocedure included in the service restart procedure becomes different.

First Exemplary Embodiment

Figure 1:
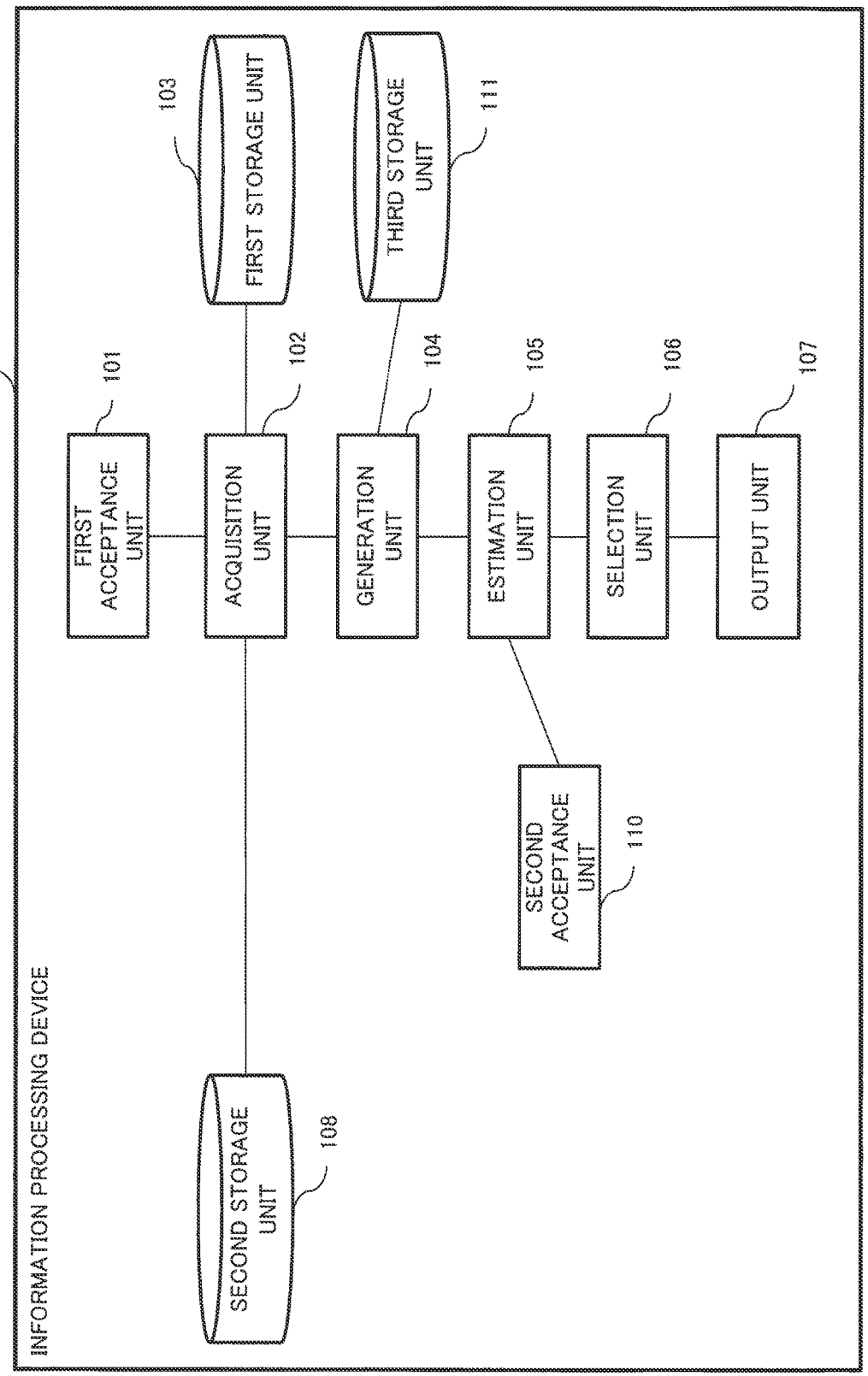
FIG. 1 is a block view illustrating a configuration of an information-processing device of a first exemplary embodiment.

FIG. 1 is a block view illustrating a configuration of an information-processing device 1 of a first exemplary embodiment. The information-processing device 1 of the first exemplary embodiment includes, for example, a server device, a personal computer, or the like.

The information-processing device 1 includes a Central Processing Unit (CPU), a storage device (a memory and a Hard Disk Drive (HDD)), an input device (for example, a keyboard), and an output device (for example, a display), which are not illustrated. The information-processing device 1 is configured to realize the following functions by executing a program stored in the storage device on the CPU.

The information-processing device 1 includes a first storage unit 103, a second storage unit 108, a third storage unit 111, a first acceptance unit 101, an acquisition unit 102, a generation unit 104, an estimation unit 105, a second acceptance unit 110, a selection unit 106, and an output unit 107.

The first acceptance unit 101 accepts a combination of failures occurred in components of the information system. The combination of component failures may be designated by the names of the components, such as {"app A," "database B"}, or numbers, such as {1, 2, 3}, by assigning numbers to the components in advance.

Figure 3:
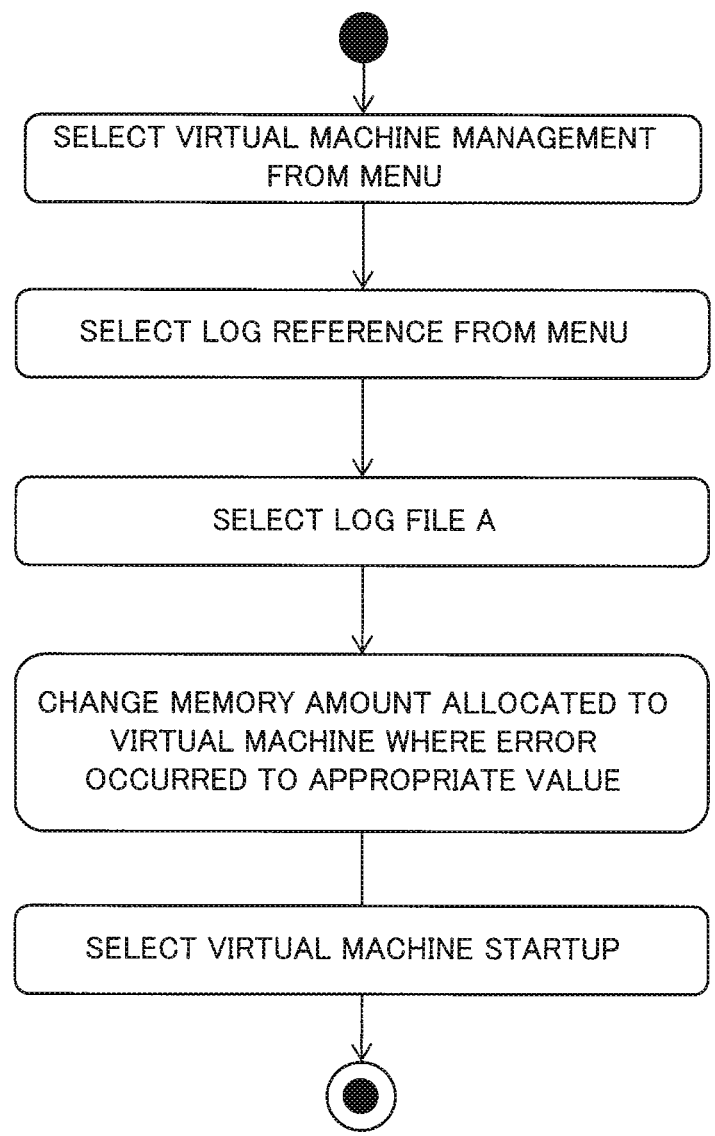
FIG. 3 is an activity diagram illustrating an example of a correction subprocedure that is stored in the first storage unit according to the first exemplary embodiment.

The first storage unit 103 stores a set of a correction subprocedure and a component relating to the correction subprocedure. FIG. 2 is an explanatory view illustrating an example of identifications (IDs) of correction subprocedures stored in the first storage unit 103 and relating components, each of which a cause of a failure is identified and the failure is corrected by the correction subprocedure. FIG. 3 is an activity diagram illustrating an example of a correction subprocedure that is stored in the first storage unit 103. In the first exemplary embodiment, the first storage unit 103 includes, for example, the content of a correction subprocedure illustrated in FIG. 3 and a correspondence relationship between a correction subprocedure ID as ID for identifying the correction subprocedure and ID of a component relating to the subprocedure as illustrated in FIG. 2. Further, the first storage unit 103 may include the name of the correction subprocedure for understanding of the user. Further, accompanying information, such as required time upon success or failure, a success rate, and the like, may be provided for the correction subprocedure and each operation (configuration change, reboot, shutdown, or the like) of the correction subprocedure.

The second storage unit 108 stores a set of a reconstruction subprocedure and a component relating to the reconstruction subprocedure. FIG. 4 is an explanatory view illustrating an example of IDs of reconstruction subprocedures and components to be reconstructed by the reconstruction subprocedures, stored in the second storage unit 108. In the first exemplary embodiment, the second storage unit 108 includes the content of a reconstruction subprocedure (not illustrated), execution time of the reconstruction subprocedure (not illustrated), and a correspondence relationship between a reconstruction subprocedure ID and ID of a component to be reconstructed by the reconstruction subprocedure as illustrated in FIG. 4. Further, the second storage unit 108 may include the name of each reconstruction subprocedure for understanding of the user. In addition, accompanying information, such as required time upon success or failure, a success rate, and the like, may be provided for each reconstruction subprocedure. The reconstruction subprocedure is, for example, reconstruction of an application and redeployment of a Virtual Machine (VM). The substantial reconstruction subprocedure may be, for example, a shell script of Linux (registered trademark) or a script of a system configuration management tool. Further, the substantial reconstruction subprocedure may be configured by a combination of a plurality of scripts and programs.

The third storage unit 111 stores a prerequisite indicating a condition required for executing each subprocedure. FIG. 5 is an explanatory view representing an example of subprocedures stored in the first storage unit 103 and the second storage unit 108 and the dependency relationships (prerequisites) of the subprocedures. For example, the prerequisite is a subprocedure necessary to be executed in advance, a (prerequisite) state necessary for executing a subprocedure, and a subprocedure that cannot be simultaneously executed (exclusive execution is necessary).

Further, the third storage unit 111 may store the state of the information system that is achieved by executing a subprocedure (the state of a specific component becomes "operating").

The acquisition unit 102 acquires a portion or all of the subprocedures for correcting and reconstructing components where failures occurred based on a combination of the failures accepted by the first acceptance unit 101. The acquisition unit 102 acquires correction subprocedures for identifying the causes of failures and correcting the failures of components where the failures occurred, based on the combination of the failures accepted by the first acceptance unit 101, by referring to information stored in the first storage unit 103. Further, the acquisition unit 102 acquires reconstruction subprocedures for reconstructing components that include components where the failures occurred based on the combination of the failures by referring to information stored in the second storage unit 108.

The generation unit 104 connects a correction subprocedure stored in the first storage unit 103 and a reconstruction subprocedure stored in the second storage unit 108 in accordance with a constraint stored in the third storage unit 111. The generation unit 104 generates information of the connection result as a candidate for a service restart procedure which is a procedure for restarting service provision of the information system.

As both correction subprocedure and reconstruction subprocedure may be considered for one component failure, the generation unit 104 generates each service restart procedure so as to include either one thereof. As such, a plurality of candidates of service restart procedures may be considered for a combination of component failures. For example, the first acceptance unit 101 accepts a combination of failures of two components A, B as an input. Suppose there are a correction subprocedure and a reconstruction subprocedure for each A, B, and A needs to be corrected or reconstructed first in consideration of a dependency relationship between the subprocedures. In such a case, the generation unit 104 generates four candidates for the service restart procedure. The generation unit 104 may generate service restart procedures for all the combinations of the subprocedures or may stop generating service restart procedures when the candidates for the service restart procedure reach a certain number to reduce calculation amount. If there is no dependency relationship between the subprocedures, in a most simple manner, the generation unit 104 may connect the subprocedures in series. If there is a constraint on the dependency relationship between the subprocedures, the generation unit 104 connects the subprocedures so as to satisfy the constraint. If there are a plurality of candidates for the connection method, the generation unit 104 may generate a plurality of service restart procedures or connect subprocedures in a manner in which the subprocedures are performed in parallel as much as possible to shorten the required time for restarting the service. Further, the generation unit 104 may set a limitation on the number of subprocedures that can perform in parallel in consideration of the resource constraints, such as human resources and computer resources.

The second acceptance unit 110 accepts desired failure restoration time. The desired failure restoration time is, for example, one day, three hours, and five minutes. These values are determined by a contract or the like with a customer.

Figure 6:
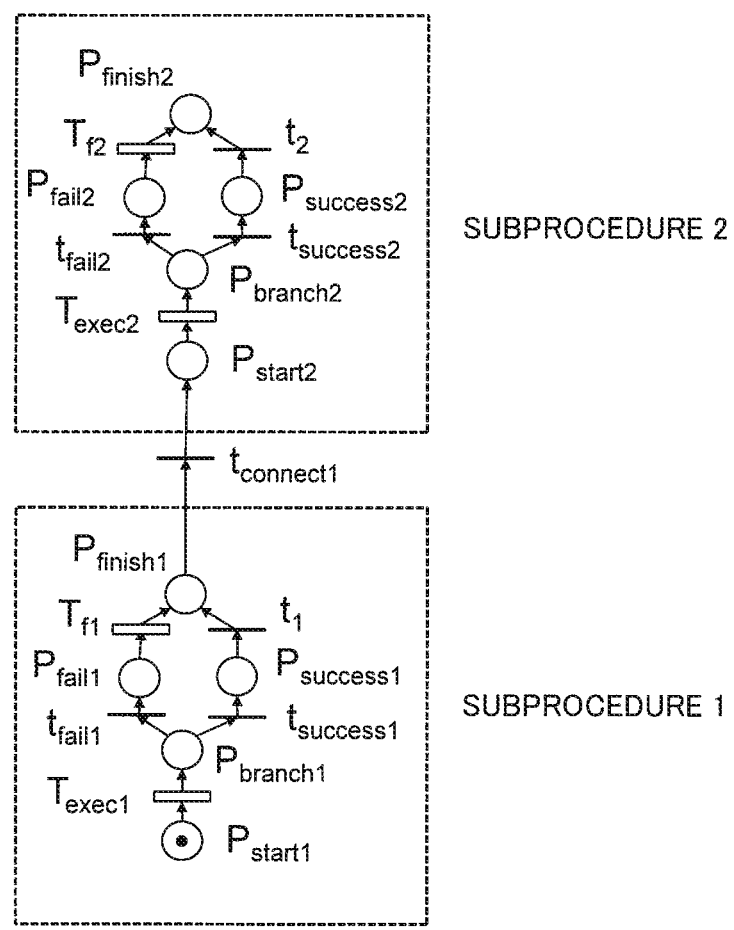
FIG. 6 is a Stochastic Petri Net that illustrates an example of a model for estimating required time based on a service restart procedure according to the first exemplary embodiment.

The estimation unit 105 estimates a value of required time, a distribution, and the like for executing a candidate for the service restart procedures generated by the generation unit 104. For example, in a most simple manner, the estimation unit 105 estimates time required for all the subprocedures included in the service restart procedure by adding the subprocedures in sequence. Alternatively, the estimation unit 105 may use a calculation equation in which required time increases in proportion to the number of subprocedures. To calculate more correctly, the estimation unit 105 may estimate the required time using a critical chain in consideration of critical paths and resource constraints. Further, as another method, a probability model, such as Stochastic Petri Net, based on the activity diagram that represents a service restart procedure may be used. That is, failure restoration time may be measured using an analysis tool based on parameter values that represent the characteristics of subprocedures of components (the average value, most frequent value, worst value, and the like of the required time and the success rates of the subprocedures). FIG. 6 illustrates an example of Stochastic Petri Net of a service restart procedure that executes two subprocedures (subprocedure 1, subprocedure 2) in series. Here, the Stochastic Petri Net includes Place represented by a circle, Arc represented by an arrow, Timed Transition represented by an outlined rectangle, Immediate Transition represented by a horizontal bar, and Token represented by a black dot inside Place. In general, an exponential distribution is often employed for the distribution of Timed Transition, while other distribution shape may instead be assumed. The lower portion than $t_{connect1}$ is a portion that represents subprocedure 1, and the upper portion than $t_{connect1}$ is a portion that represents subprocedure 2, while the two portions are connected via $t_{connect1}$. The initial marking of Token is a state where a Token is placed in $P_{start1}$. For a portion that represents subprocedure 1, for example, the inverse number of required time upon success of the subprocedure 1 is assigned as an average transition rate of $T_{exec1}$; $t_{success1}$ is assigned as the success rate of subprocedure 1; $(1-t_{success1})$ is assigned as $t_{fail}$; and the inverse number of required time upon failure of subprocedure 1 is assigned as the average transition rate of $T_{f1}$. The subprocedure 2 is likewise. After assigning the model parameters, the estimation unit 105 calculates time (distribution) taken by the transition of Token to $P_{finish2}$ as required time. If time is not a certain value and obtained by a distribution, for example, a worst value is used or a method of determining "X hours is defined as required time, if the subprocedure ends within X hours with a probability of 99%" is used.

The selection unit 106 identifies service restart procedures that satisfy desired restoration time from among the candidates for the service restart procedure and selects the one with the lowest risk of exceeding the desired restoration time caused by an unexpected failure during execution of the service restart procedure. For example, in a most simple manner, the selection unit 106 may select a service restart procedure so as to minimize the number of components relating to the operation of the subprocedures (so as not to change the states of components in stable operation as much as possible). The selection unit 106 may make an evaluation function that adds by weighting influence degrees of failures of components relating to the operation and select a service restart procedure that minimizes the result of the evaluation function. The selection unit 106 may assign a success rate and required time upon success or failure to a subprocedure of each component relating to the operation and select a service restart procedure to minimize the probability of taking not less than RTO based on the model of Stochastic Petri Net. Alternatively, the selection unit 106 may select a service restart procedure using an evaluation function that uses by weighting a plurality of risk indexes, such as those described above.

The output unit 107 outputs and presents the service restart procedure selected by the selection unit 106 to a user. The output unit 107 presents the service restart procedure on a display, for example, in an activity diagram format. If there is no service restart procedure that takes not more than RTO requirement, the output unit 107 may output "No applicable procedure" or output a service restart procedure with the shortest required time or a service restart procedure with the lowest risk as reference information for judgement of the operator.

Figure 7:
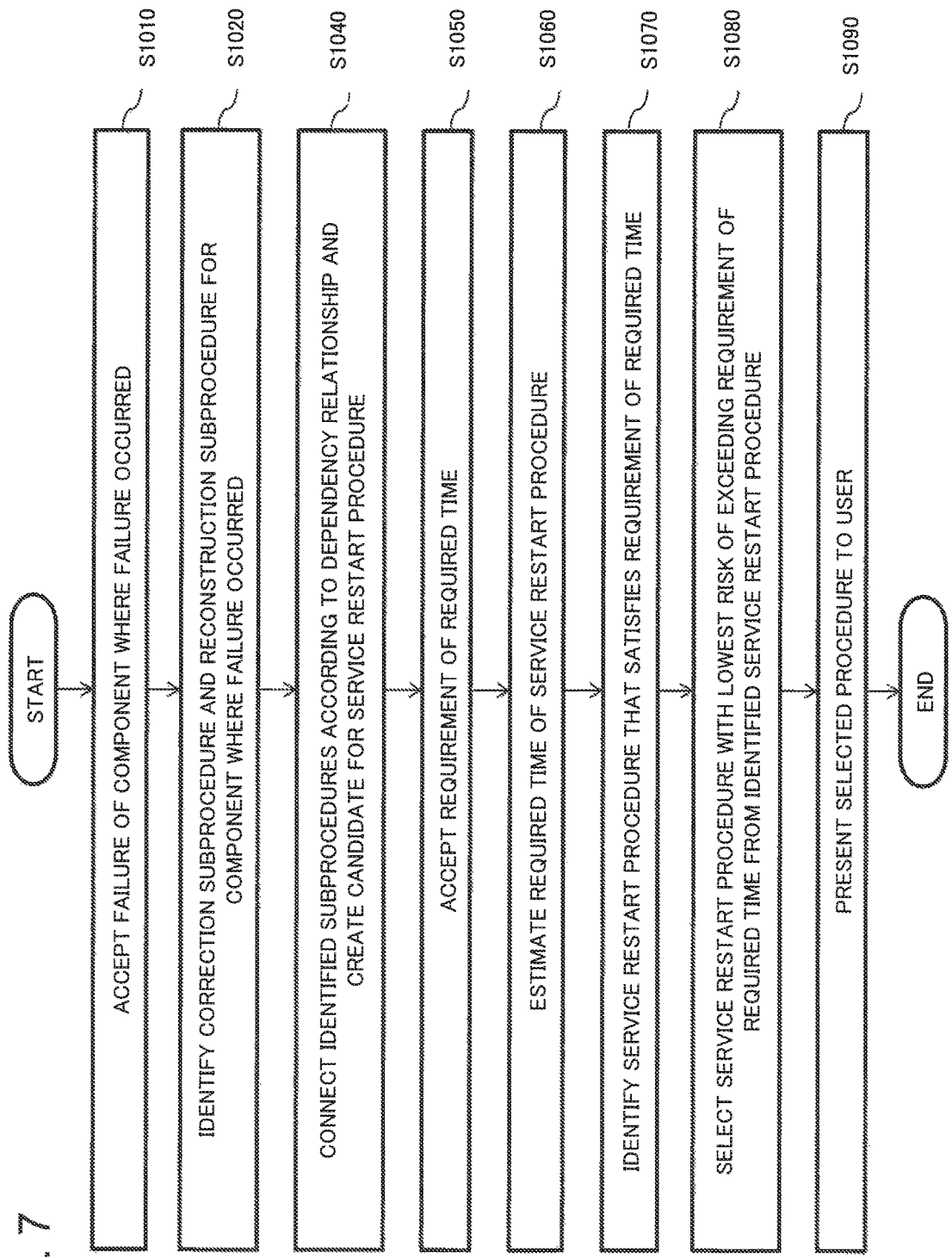
FIG. 7 is a flowchart illustrating an operation of the information-processing device of the first exemplary embodiment.

Next, the operation of the information-processing device 1 will be described. FIG. 7 is a flowchart illustrating the operation of the information-processing device according to the first exemplary embodiment.

First, the first acceptance unit 101 receives a combination of failures that occurred in components from a user (step S1010). Next, the acquisition unit 102 acquires a correction subprocedure and a reconstruction subprocedure that are necessary for changing the state of a component group where failures have occurred to a restoration state based on the combination of failures accepted at step S1010 (step S1020).

Next, the generation unit 104 generates candidates for a service restart procedure as a procedure for restarting service provision of the information system by connecting the subprocedures acquired at step S1020 in accordance with the dependency relationship among subprocedures stored in the third storage unit 111. (step S1040). Since there may be both correction subprocedure and reconstruction subprocedure for a component failure, a plurality of candidates for a service restart procedure may exist for a combination of component failures.

Next, the second acceptance unit 110 accepts desired failure restoration time (step S1050). It should be noted that step S1050 may be executed another timing between steps S1010 to S1070.

Next, the estimation unit 105 estimates required time for executing the service restart procedure generated at step S1040 (step S1060).

Next, the selection unit 106 checks whether the required time estimated at step S1060 is within the desired restoration time that was accepted at step S1050 (step S1070). The selection unit 106 identifies a service procedure, of which required time is not more than the requirement, as a candidate for the service restart procedure (step S1070). The selection unit 106 selects the one with the lowest risk of exceeding RTO requirement from among the candidates for the service restart procedure identified at step S1070 (step S1080).

Finally, the output unit 107 outputs the service restart procedure selected at step S1080 on a display or the like (step S1090).

According to the information-processing device of the first exemplary embodiment, in accordance with a combination of occurred component failures, RTO is satisfied by performing a service restart procedure and a risk of not satisfying RTO due to occurrence of an unexpected failure caused by performing the service restart procedure is reduced.

Second Exemplary Embodiment

The following will describe an information-processing device according to a second exemplary embodiment of the present invention. If a large number of component failures simultaneously occur, the number of candidates for a service restart procedure may become large and an enormous amount of calculation may be required so as to strictly calculate a service restart procedure to minimize the risk (which may not finish within realistic calculation time). Thus, reduction of the calculation amount should be addressed. In the second exemplary embodiment, to reduce the calculation amount, the search stops when a service restart procedure with a risk not more than a certain value is found.

The information-processing device according to the second exemplary embodiment is different from the information-processing device of the first exemplary embodiment in a point where the information-processing device generates a service restart procedure that satisfies a risk requirement based on a provided risk requirement. Thus, the following will mainly describe the differences from the information-processing device according to the first exemplary embodiment.

Figure 8:
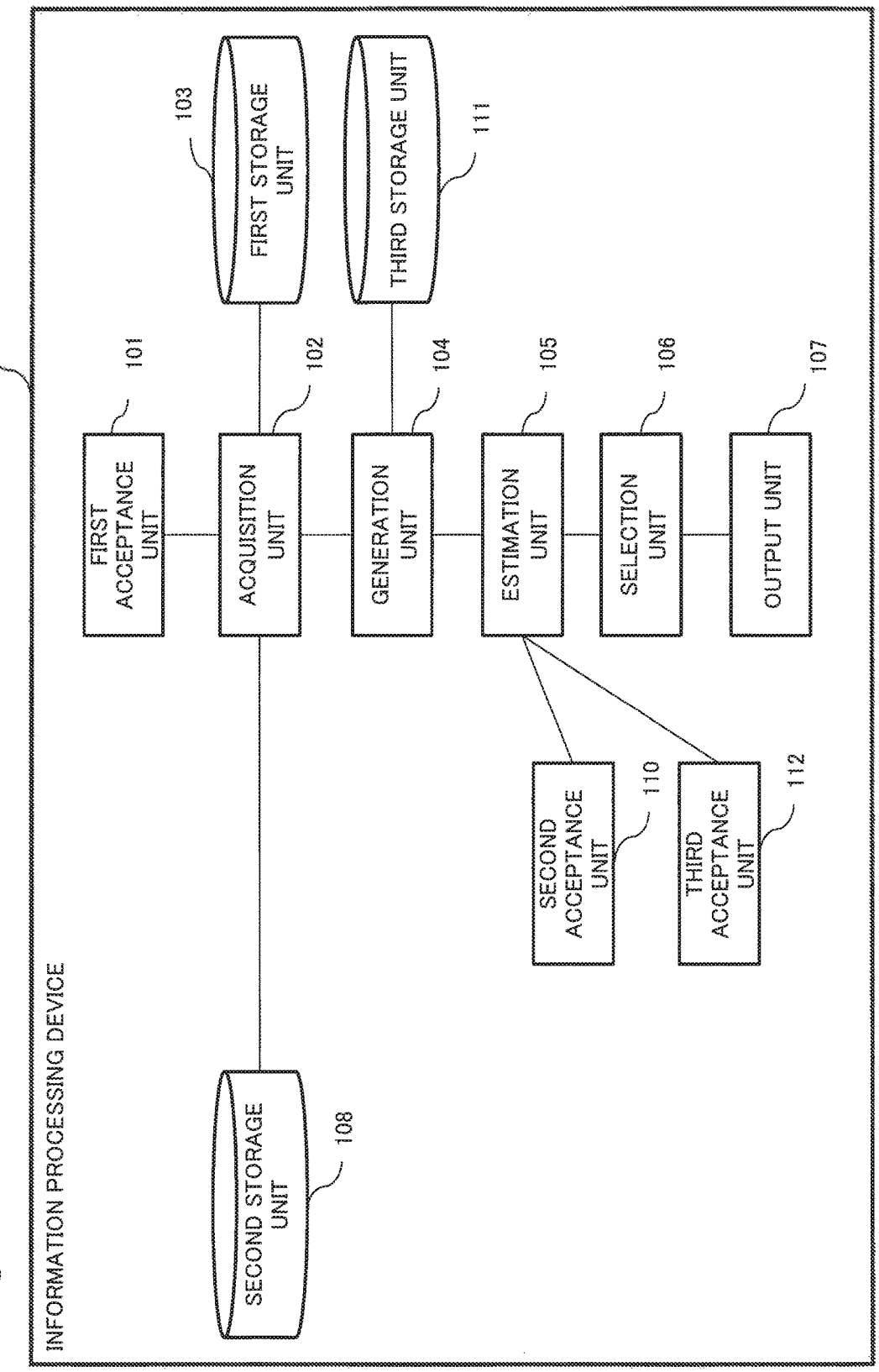
FIG. 8 is a block view illustrating a configuration of an information-processing device of a second exemplary embodiment.

FIG. 8 is a block view illustrating a configuration of the information-processing device 2 of the second exemplary embodiment. The information-processing device 2 according to the second exemplary embodiment includes a third acceptance unit 112 in addition to the components of the information-processing device 1 according to the first exemplary embodiment.

The third acceptance unit 112 of the second exemplary embodiment accepts a risk requirement from a user. The risk requirement may be, for example, the number of operation targets of subprocedures included in a service restart procedure or a probability of taking not less than RTO.

The estimation unit 105 of the second exemplary embodiment calls the selection unit 106 every time the estimation unit 105 estimates required time of one or more service restart procedures.

The selection unit 106 examines whether the service restart procedure estimated by the estimation unit 105 is not more than RTO accepted by the second acceptance unit 110 and not more than the requirement accepted by the third acceptance unit 112. If these two conditions are not satisfied, the estimation unit 105 estimates required time again using another candidate for the service restart procedure as a target for evaluation. These steps are repeated until a service restart procedure that satisfies these two conditions is found.

The components other than the estimation unit 105, third acceptance unit 112, and selection unit 106 will be omitted from the description since the other components are the same as the first exemplary embodiment.

Figure 9:
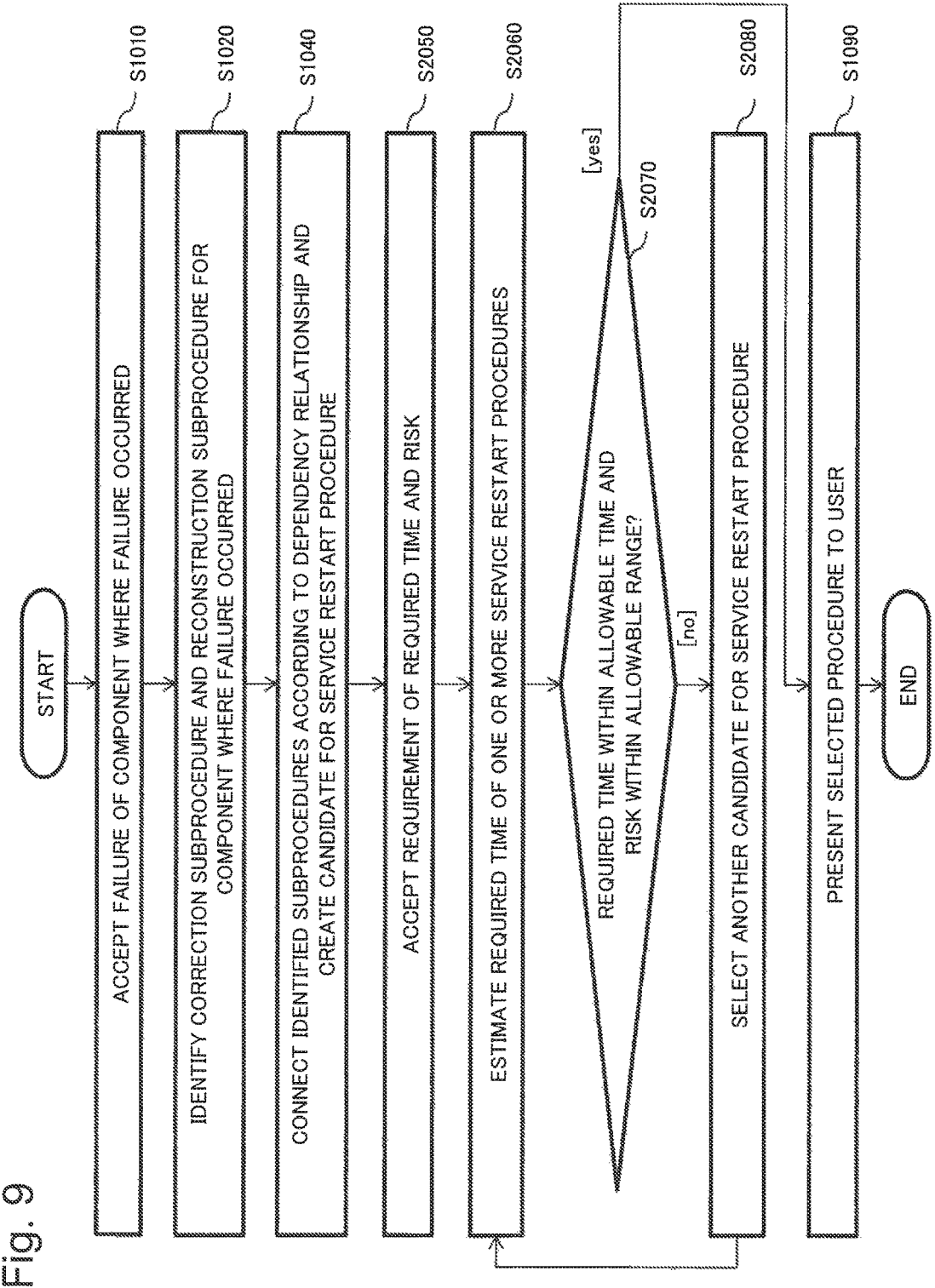
FIG. 9 is a flowchart illustrating an operation of the information-processing device of the second exemplary embodiment.

Next, the operation of the information-processing device 2 of the second exemplary embodiment will be described. FIG. 9 is a flowchart illustrating the operation of the information-processing device 2 according to the second exemplary embodiment. First, the processing of steps S1010 to S1040 are performed in the same way as the first exemplary embodiment.

Next, the second acceptance unit 110 accepts desired restoration time. Then, the third acceptance unit 112 accepts an allowable risk (step S1050). It should be noted that step S1050 may be executed another timing between steps S1010 to S1050.

Next, the estimation unit 105 estimates required time for performing one or more service restart procedures (step S1060).

Next, the selection unit 106 examines whether the required time of the service restart procedure, of which required time was estimated at step S1060, is not more than RTO and the risk is not more than the risk requirement accepted at step S1050 (step S1080). If these conditions are not satisfied, the selection unit 106 selects another candidate for the service restart procedure as a next evaluation target, then, returns to step S1060. If these conditions are satisfied, the service restart procedure is presented to the user (step S1090).

The information-processing device 2 according to the second exemplary embodiment can automatically generate a service restart procedure within a limited calculation amount and limited calculation time by generating the service restart procedure, of which risk of not satisfying RTO is not more than a risk requirement.

Third Exemplary Embodiment

Figure 10:
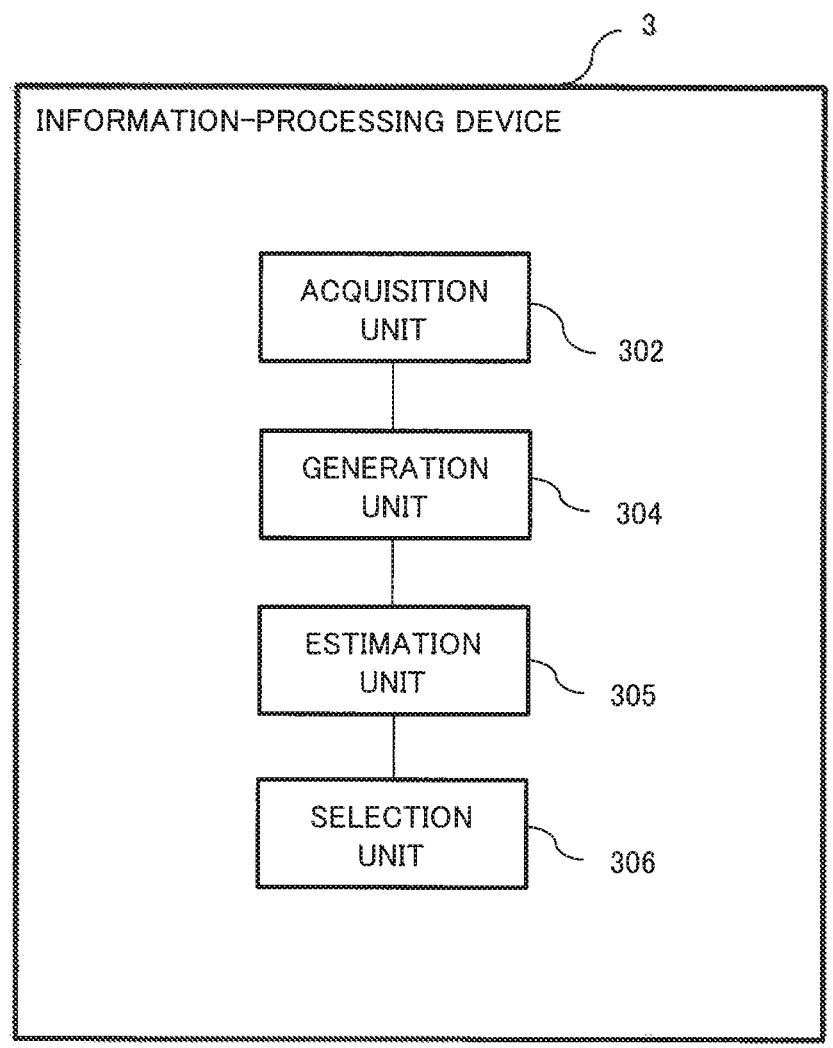
FIG. 10 is a block view illustrating a configuration of an information-processing device of a third exemplary embodiment.

The following will describe an information-processing device according to a third exemplary embodiment with reference to the drawings. The information-processing device 3 of the third exemplary embodiment is an example that illustrates the overview of the information-processing devices 1, 2 of the first and second exemplary embodiments. FIG. 10 is a block view illustrating a configuration of the information-processing device 3 according to the third exemplary embodiment.

The information-processing device 3 of the third exemplary embodiment includes an acquisition unit 302, a generation unit 304, an estimation unit 305, and a selection unit 306. It should be noted that the acquisition unit 302 includes a function equivalent to the acquisition unit 102 (FIG. 1); the generation unit 304 includes a function equivalent to the generation unit 104 (FIG. 1); the estimation unit 305 includes a function equivalent to the estimation unit 105 (FIG. 1); and the selection unit 306 includes a function equivalent to the selection unit 106 (FIG. 1).

The acquisition unit 302 acquires, based on a combination of failures occurred in components of an information system, a correction subprocedure for identifying the cause of a failure of a component and correcting a trouble spot and a reconstruction subprocedure for reconstructing a component.

The generation unit 304 generates a candidate for a service restart procedure of the information system by connecting the correction subprocedure and the reconstruction subprocedure in accordance with a dependency relationship between the acquired correction subprocedure and reconstruction subprocedure. The estimation unit 305 estimates required time of the candidate for the service restart procedure.

The selection unit 306 identifies a service restart procedure, of which required time satisfies desired restoration time from among required time of the candidates for the service restart procedure, and selects, from among the service restart procedures that have a risk of exceeding desired restoration time, a service restart procedure based on the high/low degree of the risk.

Figure 11:
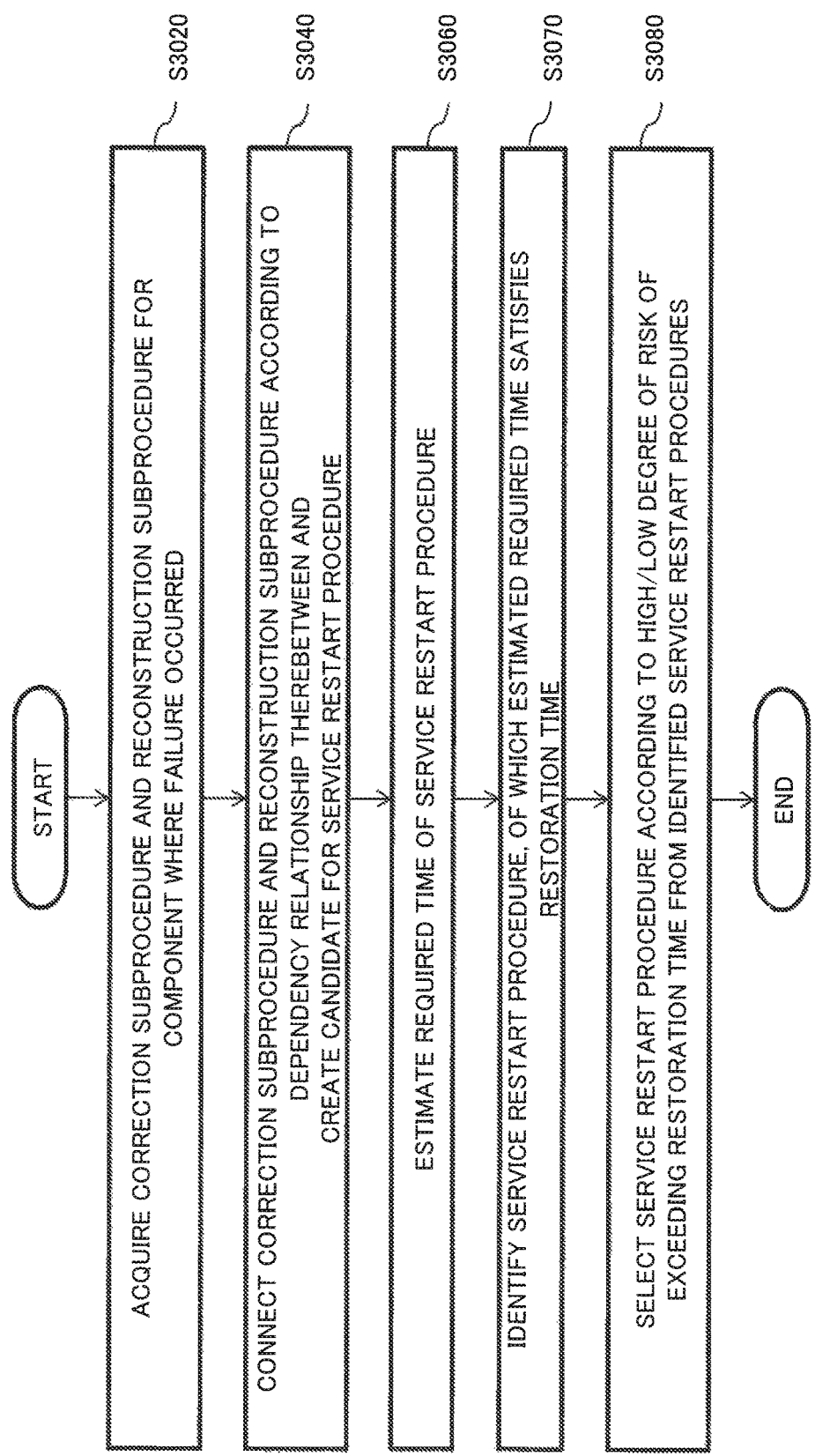
FIG. 11 is a flowchart illustrating an operation of the information-processing device of the third exemplary embodiment.

The following will describe an operation of the information-processing device according to the third exemplary embodiment with reference to the drawings. FIG. 11 is a flowchart illustrating the operation of the information-processing device of the third exemplary embodiment. As illustrated in FIG. 11, the acquisition unit 302 acquires, based on a combination of failures occurred in components of the information system, a correction subprocedure for identifying the cause of a failure of a component and correcting a trouble spot and a reconstruction subprocedure for reconstructing a component (S3020).

Next, the estimation unit 305 generates a candidate for a service restart procedure of the information system by connecting the correction subprocedure and reconstruction subprocedure in accordance with the dependency relationship between the acquired correction subprocedure and reconstruction subprocedure (S3040). Next, the estimation unit 305 estimates required time of the candidate for the service restart procedure (S3060).

Further, the selection unit 306 identifies a service restart procedure, of which required time satisfies desired restoration time, from among required time of the candidates for the service restart procedure (S3070) and selects, from among the service restart procedures that have a risk of exceeding desired restoration time, a service restart procedure based on the high/low degree of the risk (S3080).

According to the third exemplary embodiment, in accordance with a combination of occurred component failures, RTO can be satisfied by performing a service restart procedure and a risk of not satisfying RTO due to occurrence of an unexpected failure caused by performing the service restart procedure can be reduced.

It should be noted that the present invention is not limited to the above-described exemplary embodiments. A variety of modifications that will be understood by those skilled in the art can be made to the configuration and operation of the present invention within the scope thereof. The present invention is applicable to a device that is used for restarting a service when a failure occurred in an information-processing system.

Further, while the required time and risk of a service restart procedure are used as evaluation indexes in the above-described exemplary embodiments, evaluation indexes relating to other system requirements, such as the cost of executing a service restart procedure, may also be used.

Further, while the functions of the information-processing system 1, 2 in the above-described exemplary embodiments are realized by executing a program (software) with the CPU, the functions may be realized by hardware, such as circuits.

Further, while the program is stored in a storage device in the above-described exemplary embodiments, the program may be stored in a computer-readable recording medium. For example, the recording medium is a portable medium, such as a flexible disc, an optical disc, a magneto-optical disc, or a semiconductor memory.

Figure 12:
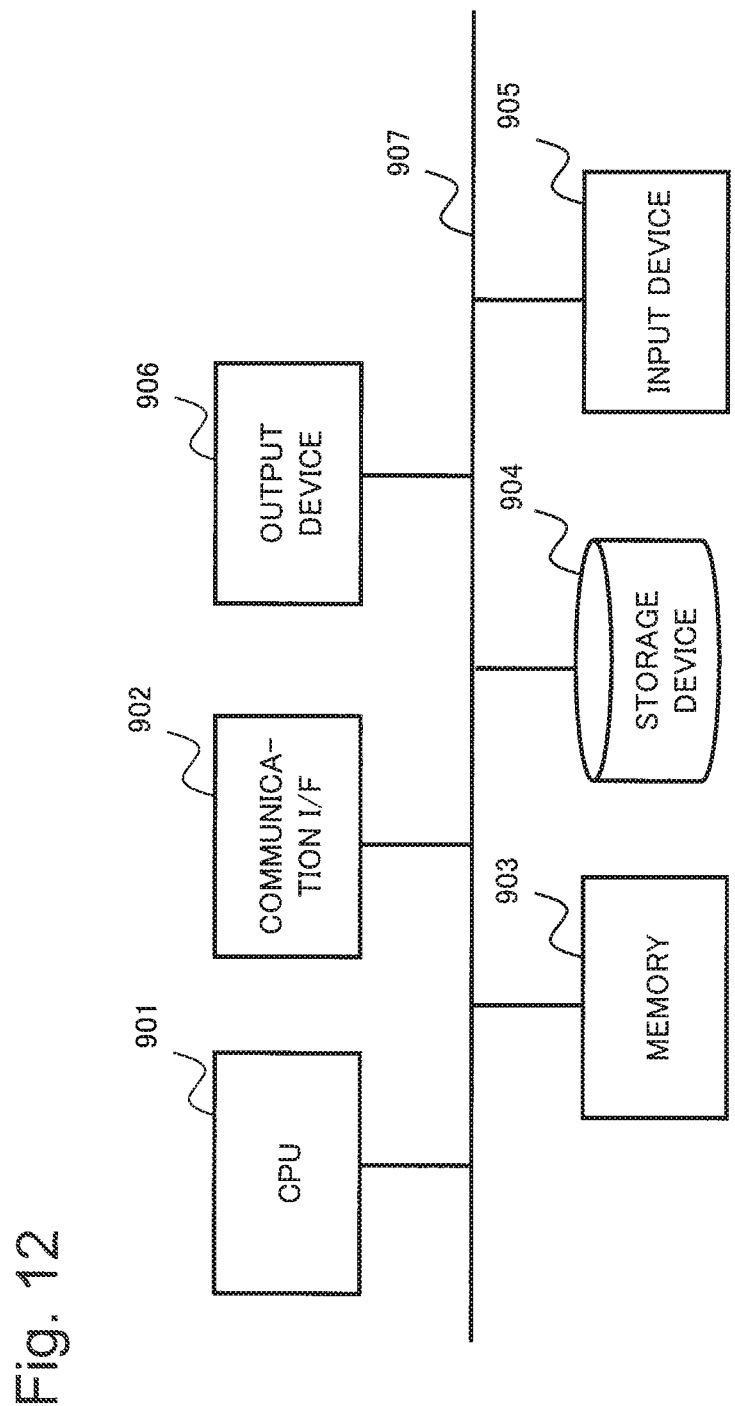
FIG. 12 is a diagram illustrating a hardware configuration that realizes an information-processing device according to the first to third exemplary embodiments by a computer device.

FIG. 12 is a diagram illustrating a hardware configuration of the generation unit, estimation unit, selection unit, or the like of the information-processing device according to the first to third exemplary embodiments of the present invention, which is realized by a computer device.

As illustrated in FIG. 12, the information-processing device includes a Central Processing Unit (CPU) 901, a communication interface (communication I/F) 902 for connecting a network, a memory 903, and a storage device 904, such as a hard disk, for storing a program. Further, the CPU 901 is connected to an input device 905 and an output device 906 via a system bus 907.

The CPU 901 controls the information-processing device according to the first to third exemplary embodiments of the present invention by operating the operating system. Further, the CPU 901 loads, for example, a program and data to the memory 903 from the storage medium mounted on the drive device.

Further, for example, having a function of processing an information signal that is input from the acquisition unit and the like of the information-processing device 1, 2, or 3 of each exemplary embodiment, the CPU 901 executes processing of a variety of functions according to the program.

The storage device 904 is, for example, an optical disk, a flexible disk, a magneto-optical disk, an external hard disk, a semiconductor memory, or the like. The recording medium as a portion of the storage device 904 is a non-transitory storage device that stores the program. Further, the program may be downloaded from an external computer (not illustrated) connected to a communication network.

The input device 905 is realized by, for example, a mouse, a keyboard, an internal key button, a card insert opening, a touch panel, or the like, and used for input operation.

The output device 906 is realized by, for example, a display that is used to output information and the like, which was processed by the CPU 901, for user's examination.

As described above, each exemplary embodiment of the present invention is realized by a hardware configuration illustrated in FIG. 12. However, each unit of implementation means in the information-processing device is not particularly limited. That is, the information-processing device may be realized by a physically coupled device or realized by a plurality of devices where physically detached two or more devices are connected in a wired or wireless manner.

The claimed invention has been described so far with reference to the above-described exemplary embodiments (and examples), without limitation to the above-described exemplary embodiments (and examples). A variety of modifications that will be understood by those skilled in the art can be made to the configuration and details of the claimed invention within the scope thereof.

This application claims priority based on Japanese Patent Application No. 2014-102278 filed on Dec. 18, 2014, which application is incorporated herein in its entirety by disclosure.

The part or whole of the exemplary embodiments described above can as well be described as the following Supplementary Notes without limitation.

(Supplementary Note 1)

An information-processing device including:

a first storage unit that stores a correction subprocedure that is a procedure for identifying a cause of a failure of a component where the failure occurred and correcting a trouble spot;

a second storage unit that stores a reconstruction subprocedure that is a procedure for reconstructing a component where a failure occurred;

a third storage unit that stores a dependency relationship between the subprocedures;

a first acceptance unit that accepts a combination of failures occurred in components of an information system;

an acquisition unit that acquires the correction subprocedure and the reconstruction subprocedure that are necessary for restoring the components from the first storage unit and the second storage unit based on the combination of the failures occurred in the components;

a generation unit that generates at least one candidate for a service restart procedure as a procedure for restarting a service of the information system by connecting the acquired subprocedures in accordance with a constraint stored in the third storage unit;

an estimation unit that estimates required time of the at least one candidate for the service restart procedure;

a second acceptance unit that accepts desired restoration time;

a selection unit that identifies a service restart procedure that satisfies desired restoration time from among the candidates for the service restart procedure and selects, from among the identified candidates for the service restart procedure, a service restart procedure based on a high/low degree of a risk of exceeding the desired restoration time; and an output unit that outputs the selected service restart procedure.

(Supplementary Note 2)

The information-processing device according to supplementary note 1, further including:

a third acceptance unit that accepts a risk requirement, wherein the estimation unit calls the selection unit every time the estimation unit estimates required time of one or more service restart procedures, and for the service restart procedures evaluated by the estimation unit, the selection unit selects a service restart procedure that satisfies the desired restoration time that the second acceptance unit accepted and satisfies the risk requirement that the third acceptance unit accepted.

(Supplementary Note 3)

The information-processing device according to supplementary note 1 or 2, wherein the selection unit selects a service restart procedure that minimizes, as a risk, the number of components relating to an operation.

(Supplementary Note 4)

The information-processing device according to supplementary note 1 or 2, wherein the selection unit selects a service restart procedure that minimizes, as a risk, an evaluation function by weighting an influence degree of a failure for each component relating to an operation (Supplementary Note 5)

The information-processing device according to supplementary note 1 or 2, wherein the selection unit selects a service restart procedure that minimizes, as a risk, a probability of not satisfying the desired restoration time.

(Supplementary Note 6)

The information-processing device according to supplementary note 1 or 2, wherein the selection unit selects a service restart procedure so as to minimize an evaluation function that uses by weighting a plurality of risk indexes.

(Supplementary Note 7)

The information-processing device according to any one of supplementary notes 1 to 6, wherein the estimation unit estimates the required time based on a parameter value that represents a characteristic of each subprocedure and a probability model.

(Supplementary Note 8)

The information-processing device according to any one of supplementary notes 1 to 7, wherein the estimation unit estimates the required time based on required time and a success rate of each subprocedure.

(Supplementary Note 9)

A processing method including:

storing, in a first storage unit, a correction subprocedure that is a procedure for identifying a cause of a failure of a component where the failure occurred and correcting a trouble spot;

storing, in a second storage unit, a reconstruction subprocedure that is a procedure for reconstructing a component where a failure occurred;

storing, in a third storage unit, a dependency relationship between the subprocedures;

accepting a combination of failures occurred in components of an information system;

acquiring the correction subprocedure and the reconstruction subprocedure that are necessary for restoring the components from the first storage unit and the second storage unit based on the combination of the failures occurred in the components;

generating at least one candidate for a service restart procedure as a procedure for restarting a service of the information system by connecting the acquired subprocedures in accordance with a constraint stored in the third storage unit;

estimating required time of the at least one candidate for the service restart procedure;

accepting the desired restoration time;

identifying a service restart procedure that satisfies required time from among the candidates for the service restart procedure and selecting, from among the identified candidates for the service restart procedure, a service restart procedure based on a high/low degree of a risk of exceeding the desired restoration time; and outputting the selected service restart procedure.

(Supplementary Note 10)

A program that causes a computer to execute:

storing, in a first storage unit, a correction subprocedure for identifying a cause of a failure of a component where the failure occurred and correcting a trouble spot;

storing, in a second storage unit, a reconstruction subprocedure for reconstructing a component where a failure occurred;

storing, in a third storage unit, a dependency relationship between the subprocedures;

accepting a combination of failures occurred in the components of an information system;

acquiring the correction subprocedure and the reconstruction subprocedure that are necessary for restoring the components from the first storage unit and the second storage unit based on the combination of the failures occurred in the component;

generating a candidate for a service restart procedure as a procedure for restarting a service of the information system by connecting the acquired subprocedures in accordance with a constraint stored in the third storage unit;

estimating required time of the candidate for the service restart procedure;

accepting the desired restoration time;

identifying a service restart procedure that satisfies required time from among the candidates for the service restart procedure and selecting, from among the identified service restart procedures, a service restart procedure based on a high/low degree of a risk of exceeding the desired restoration time; and outputting the selected service restart procedure.

(Supplementary Note 11)

An information-processing device including:

an acquisition unit that acquires, based on the combination of the failures occurred in the components of an information system, a correction subprocedure for identifying a cause of a failure of a component where the failure occurred and correcting a trouble spot, and the reconstruction subprocedure that are necessary for restoring the components;

a generation unit that generates at least one candidate for a service restart procedure of the information system by connecting the correction subprocedure and the reconstruction subprocedure in accordance with a dependency relationship between the acquired correction subprocedure and reconstruction subprocedure;

an estimation unit that estimates required time of the at least one candidate for the service restart procedure;

a selection unit that identifies a service restart procedure that satisfies required time from among the candidates for the service restart procedure and selects, from among the identified candidates for the service restart procedure, a service restart procedure based on a high/low degree of a risk of exceeding the desired restoration time.

(Supplementary Note 12)

The information-processing device according to supplementary note 11, wherein the estimation unit calls the selection unit every time the estimation unit estimates required time of one or more service restart procedures, and for the service restart procedures evaluated by the estimation unit, the selection unit selects a service restart procedure that satisfies the desired restoration time that the second acceptance unit accepted and satisfies the risk requirement that the third acceptance unit accepted.

(Supplementary Note 13)

The information-processing device according to supplementary note 11 or 12, wherein the selection unit selects a service restart procedure that minimizes, as a risk, the number of components relating to an operation.

(Supplementary Note 14)

The information-processing device according to supplementary note 11 or 12, wherein the selection unit selects a service restart procedure that minimizes, as a risk, an evaluation function by weighting an influence degree of a failure for each component relating to an operation.

(Supplementary Note 15)

The information-processing device according to supplementary note 11 or 12, wherein the selection unit selects a service restart procedure that minimizes, as a risk, a probability of not satisfying the desired restoration time.

(Supplementary Note 16)

The information-processing device according to supplementary note 11 or 12, wherein the selection unit selects a service restart procedure so as to minimize an evaluation function that uses by weighting a plurality of risk indexes.

(Supplementary Note 17)

The information-processing device according to any one of supplementary notes 11 to 16, wherein the estimation unit estimates the required time based on a parameter value that represents a characteristic of each subprocedure and a probability model.

(Supplementary Note 18)

The information-processing device according to any one of supplementary notes 11 to 17, wherein the estimation unit estimates the required time based on required time and a success rate of each subprocedure.

(Supplementary Note 19)

An processing method including:

acquiring, based on a combination of failures occurred in components of an information system, a correction subprocedure for identifying a cause of the failures of the components and correcting a trouble spot and a reconstruction subprocedure for reconstructing the components;

generating at least one candidate for a service restart procedure of the information system by connecting the correction subprocedure and the reconstruction subprocedure in accordance with a dependency relationship between the acquired correction subprocedure and reconstruction subprocedure;

estimating required time of the at least one candidate for the service restart procedure; and identifying the service restart procedure, of which required time satisfies desired restoration time from among the required time of the candidates for the service restart procedure and selecting, from among the identified candidates for the service restart procedure that has a risk of exceeding the desired restoration time, the service restart procedure based on a high/low degree of the risk.

(Supplementary Note 20)

A program for causing a computer to execute:

acquiring, based on a combination of failures occurred in components of an information system, a correction subprocedure for identifying a cause of the failure of the component and correcting a trouble spot and a reconstruction subprocedure for reconstructing the component;

generating at least one candidate for a service restart procedure of the information system by connecting the correction subprocedure and the reconstruction subprocedure in accordance with a dependency relationship between the acquired correction subprocedure and reconstruction subprocedure;

estimating required time of the at least one candidate for the service restart procedure; and identifying the service restart procedure, of which required time satisfies desired restoration time from among the required time of the candidates for the service restart procedure, and selecting, from among the identified candidates for the service restart procedure that has a risk of exceeding the desired restoration time, the service restart procedure based on a high/low degree of the risk.

REFERENCE SIGNS LIST 1, 2, 3 Information-processing device
101 First acceptance unit
102 Acquisition unit
103 First storage unit
104 Generation unit
105 Estimation unit
106 Selection unit
107 Output unit
108 Second storage unit
110 Second acceptance unit
111 Third storage unit
112 Third acceptance unit
302 Acquisition unit
304 Generation unit
305 Estimation unit
306 Selection unit
901 CPU
902 Communication interface
903 Memory
904 Storage device
905 Input device
906 Output device
907 Bus

What is claimed is:

1. An information-processing device comprising:
a memory storing instructions;
at least one processor configured to process the instructions to:
acquire, based on a combination of failures occurred in components of an information system, a correction subprocedure for identifying a cause of the failure of the component and correcting a trouble spot and a reconstruction subprocedure for reconstructing the component;
generate at least one candidate for a service restart procedure of the information system by connecting the correction subprocedure and the reconstruction subprocedure in accordance with a dependency relationship between the acquired correction subprocedure and reconstruction subprocedure;
estimate required time of the at least one candidate for the service restart procedure; and
identify the service restart procedure, of which required time satisfies desired restoration time from among the candidates for the service restart procedure and selects, from among the identified candidates for the service restart procedure that has the risk of exceeding the desired restoration time, the service restart procedure based on a high/low degree of the risk.

2. The information-processing device according to claim 1,
wherein the identifies the service restart procedure each time the processor estimates the required time of one or more of the service restart procedures, and,
for the service restart procedure, the processor selects the service restart procedure that satisfies the desired restoration time and a predetermined risk requirement.

3. The information-processing device according to claim 1, wherein the processor selects a service restart procedure that minimizes, as a risk, the number of components relating to an operation.

4. The information-processing device according to claim 1, wherein the processor selects a service restart procedure that minimizes, as a risk, an evaluation function by weighting an influence degree of a failure for each component relating to an operation.

5. The information-processing device according to claim 1, wherein the processor selects a service restart procedure that minimizes, as a risk, a probability of not satisfying the desired restoration time.

6. The information-processing device according to claim 1, wherein the processor selects a service restart procedure so as to minimize an evaluation function that uses by weighting a plurality of risk indexes.

7. The information-processing device according to claim 1, wherein the processor estimates the required time based on a parameter value that represents a characteristic of each subprocedure and a probability model.

8. The information-processing device according to claim 1, wherein the processor estimates the required time based on required time and a success rate of each subprocedure.

9. An processing method comprising:
acquiring, based on a combination of failures occurred in components of an information system, a correction subprocedure for identifying a cause of the failures of the components and correcting a trouble spot, and a reconstruction subprocedure for reconstructing the components;
generating at least one candidate for a service restart procedure of the information system by connecting the correction subprocedure and the reconstruction subprocedure in accordance with a dependency relationship between the acquired correction subprocedure and reconstruction subprocedure;
estimating required time of the at least one candidate for the service restart procedure; and
identifying the service restart procedure, of which required time satisfies desired restoration time from among the required time of the candidates for the service restart procedure and selecting, from among the identified candidates for the service restart procedure that has a risk of exceeding the desired restoration time, the service restart procedure based on a high/low degree of the risk.

10. A non-transitory computer-readable recording medium that records a program for causing a computer to execute:
  acquiring, based on a combination of failures occurred in components of an information system, a correction subprocedure for identifying a cause of the failure of the component and correcting a trouble spot, and a reconstruction subprocedure for reconstructing the component;
  generating at least one candidate for a service restart procedure of the information system by connecting the correction subprocedure and the reconstruction subprocedure in accordance with a dependency relationship between the acquired correction subprocedure and reconstruction subprocedure;
  estimating required time of the at least one candidate for the service restart procedure; and
  identifying the service restart procedure, of which required time satisfies desired restoration time from among the required time of the candidates for the service restart procedure, and selecting, from among the identified candidates for the service restart procedure that has a risk of exceeding the desired restoration time, the service restart procedure based on a high/low degree of the risk.

* * * * *